(12) United States Patent
Arakawa et al.

(10) Patent No.: US 9,635,242 B2
(45) Date of Patent: Apr. 25, 2017

(54) IMAGING APPARATUS (71) Applicant: Panasonic Intellectual Property Management Co., Ltd., Osaka (JP)

(72) Inventors: Kenji Arakawa, Kyoto (JP); Motonori Ogura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/860,709

(22) Filed: Sep. 22, 2015

(65) Prior Publication Data

US 2016/0094779 A1   Mar. 31, 2016

(30) Foreign Application Priority Data

Sep. 29, 2014  (JP) ................................ 2014-197712
Aug. 26, 2015  (JP) ................................ 2015-166935

(51) Int. Cl.

| H04N 5/232 | (2006.01) |
|---|---|
| H04N 5/77 | (2006.01) |
| H04N 5/907 | (2006.01) |
| H04N 9/804 | (2006.01) |
| H04N 5/222 | (2006.01) |
| H04N 5/235 | (2006.01) |
| H04N 5/238 | (2006.01) |

(52) U.S. Cl.
CPC ....... *H04N 5/23212* (2013.01); *H04N 5/2226* (2013.01); *H04N 5/238* (2013.01); *H04N 5/2351* (2013.01); *H04N 5/2352* (2013.01); *H04N 5/23229* (2013.01); *H04N 5/23293* (2013.01); *H04N 5/772* (2013.01); *H04N 5/907* (2013.01); *H04N 9/8042* (2013.01)

(58) Field of Classification Search
CPC ............. H04N 5/2254; H04N 5/23212; H04N 5/23293; H04N 5/772; H04N 5/907; H04N 9/8042
See application file for complete search history.

(56) References Cited

U.S. PATENT DOCUMENTS

2009/0256951 A1*  10/2009  Yumiki .................. G03B 13/30
                                                                  348/345
2009/0322935 A1*  12/2009  Yamasaki ................ G02B 7/36
                                                                  348/349
2010/0103311 A1    4/2010  Makii
(Continued)

FOREIGN PATENT DOCUMENTS

| JP | 2963990 B | 10/1999 |
|---|---|---|
| JP | 2009-015828 | 1/2009 |
| JP | 2013-239119 | 11/2013 |

*Primary Examiner* — Amy Hsu
(74) *Attorney, Agent, or Firm* — Wenderoth, Lind & Ponack, L.L.P.

(57) ABSTRACT

The imaging apparatus of the present disclosure comprises the following structural elements: an optical system including at least one lens; an imaging element configured to form an object image with light collected by the optical system, and produce first image data; and an image processing section configured to calculate a distance to an object for the image, and produce second image data by providing the first image data with image processing. The image processing section sets a depth of field based on the calculated distance to the object, and carries out the image processing by applying the depth of field.

8 Claims, 8 Drawing Sheets

(56) References Cited

U.S. PATENT DOCUMENTS

| | | | |
|---|---|---|---|
| 2010/0157127 A1* | 6/2010 | Takayanagi | H04N 5/23293 348/333.02 |
| 2011/0205403 A1* | 8/2011 | Ito | G02B 7/36 348/241 |
| 2012/0027393 A1* | 2/2012 | Tsuda | H04N 5/23212 396/102 |
| 2012/0105590 A1* | 5/2012 | Fukumoto | H04N 5/23216 348/46 |
| 2013/0308005 A1 | 11/2013 | Takahashi | |
| 2014/0210999 A1* | 7/2014 | Komatsu | G06T 7/571 348/135 |
| 2014/0307145 A1* | 10/2014 | Ito | H04N 5/23212 348/333.08 |
| 2015/0156404 A1 | 6/2015 | Takahashi | |

* cited by examiner

IMAGING APPARATUS

BACKGROUND

Technical Field

The present disclosure relates to imaging apparatuses equipped in such as digital cameras or portable phones.

Description of the Related Art

Various methods have been proposed for measuring a depth of three-dimensional scene in noncontact manner, to be more specific, for measuring a distance to an object to be captured. These methods are divided broadly into two categories, namely, an active method and a passive method. The active method irradiates the object with an infrared ray, an ultrasonic wave, or a laser beam, and then measures a time until a reflective wave returns, or measures an angle of the reflective wave, thereby calculating the distance. The passive method calculates the distance based on an image of the object. The passive method is widely used in cameras because the passive method does not need a device for irradiation of the infrared ray.

A method of DFD (Depth from Defocus, and this method is referred to simply as DFD hereinafter) is disclosed as one of the passive methods. DFD calculates the distance based on blur information which shows changes in size or in shape depending on the distance to the object. DFD does not need multiple cameras, and allows measuring the distance based on a small number of images. A process of measuring a distance to an object by using DFD is referred to as a DFD process.

A principle of DFD is briefly described hereinafter. DFD is a method for measuring a distance based on blur information obtained from multiple images having different in-focus positions. A captured image containing a blur is formed by convoluting a point spread function (PSF), which is a function of a distance to an object, onto an omni-focal image that shows no blur caused by lenses. Since PSF uses the distance to the object as a vas DFD detects the blur from the blurred image, thereby finding the distance to the object.

At this time, one formula is established among a blurred image, omni-focal image, and a distance to an object, with respect to a blurred image of which omni-focal image and a distance to the object stay as unknowns. Imaging another blurred image having an in-focus position different from the present blurred image will create another formula, and solving these multiple formulae allows finding the distance to the object. Patent Literature 1 and other documents disclose how to obtain and solve the formulae.

CITATION LIST

Patent Literature: PTL 1 Japanese Patent No. 2963990

SUMMARY

When a live view is watched, smoothness in dynamic images takes precedence of other items, so that a shutter speed and an iris in shooting the dynamic images are different from those in shooting still images. As a result, an image watched in live view exhibits a blur touch different from that of a still image. An imaging apparatus not capable of replacing lenses thus cannot exhibit a greater blur touch, so that this imaging apparatus has a limit to its expression method.

The imaging apparatus of the present disclosure comprises the following structural elements:

an optical system including at least one lens;

an imaging element configure to form an object image with light collected by the optical system, and produce first image data; and an image processing section configure to calculates a distance to an object for the object image, and produce second image data by providing the first image data with image processing. The image processing section sets a depth of field based on the calculated distance to the object, and carries out the image processing by applying the depth of field.

The present disclosure provides an imaging apparatus capable of displaying a live-view image and a still image both of which have the same depth of field, and also provides an imaging apparatus to which a user can assign any depth of field, and the user can specify an in-focus region and a blur region.

DETAILED DESCRIPTION OF THE PREFERRED EMBODIMENTS

The embodiments are detailed hereinafter with reference to the accompanying drawings. Uselessly detailed descriptions are sometimes omitted. For instance, detailed descriptions of well-known matters can be omitted, and duplicated descriptions about substantially the same structural elements can be omitted, because these omitters will prevent the descriptions hereinafter from being uselessly redundant, and will promote the readers to understand the disclosure with more ease.

The accompanying drawings and the descriptions below are prepared for skilled person in the art to fully understand the present disclosure, so that these materials do not intend to limit the subjects specified in the claims.

First Exemplary Embodiment The first embodiment is demonstrated hereinafter with reference to FIG. 1-FIG. 5.

1-1. Structure

Figure 1:
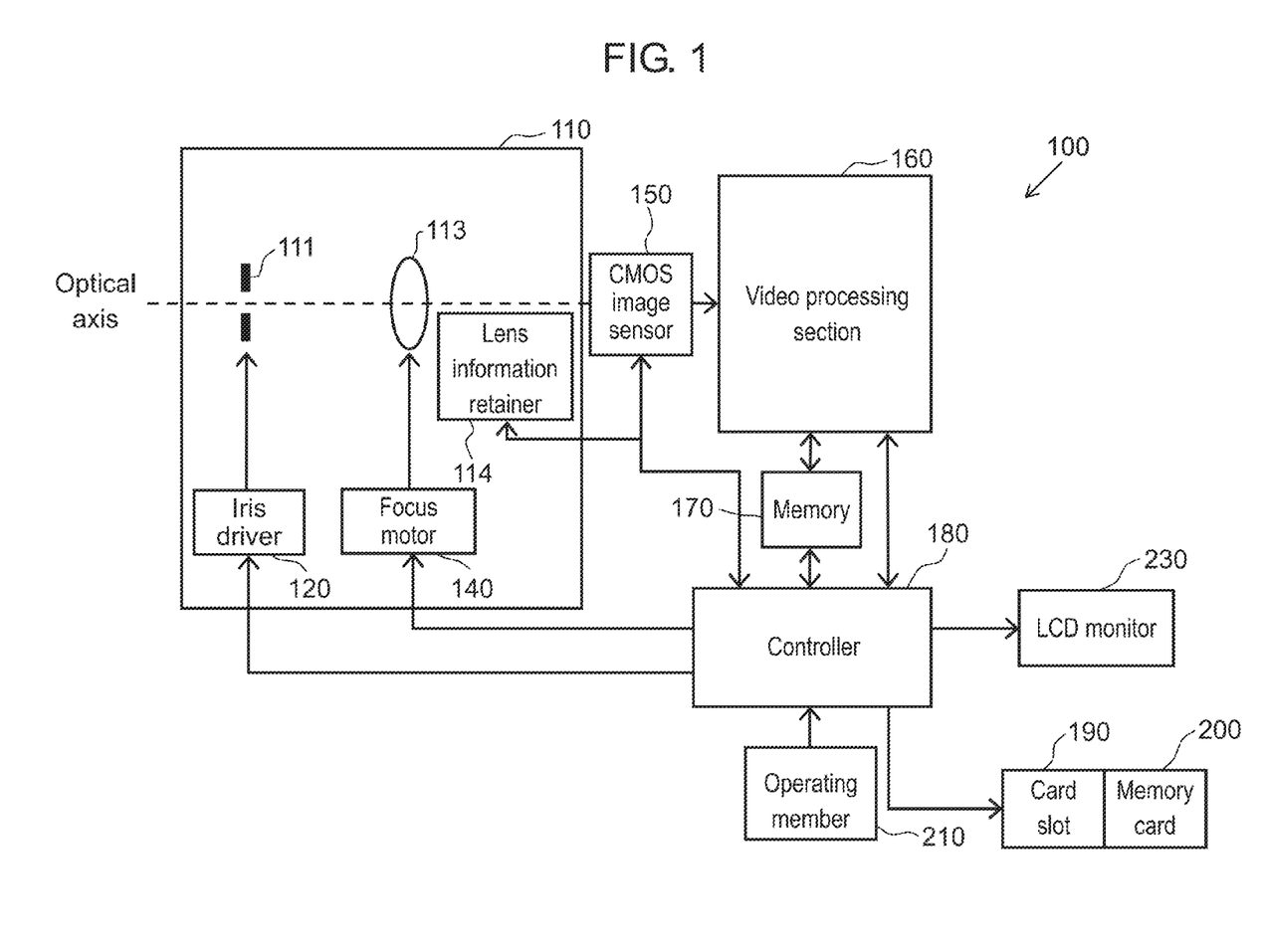
FIG. 1 shows an electrical structure of an imaging apparatus in accordance with a first embodiment.

An electrical structure of imaging apparatus 100 in accordance with the first embodiment is demonstrated hereinafter. FIG. 1 shows a structure of imaging apparatus 100 in accordance with the first embodiment. Imaging apparatus 100 comprises the following structural elements:

optical system 110;
CMOS image sensor 150 (CMOS=complementary metal oxide semiconductor);
video processing section 160;
memory 170;
controller 1180;
card slot 190;
memory card 200 (recording section);
operating member 210; and
LCD monitor 230.

In this embodiment, aging apparatus 100 is a digital camera, and optical system 110 is detachable, in other words, image apparatus 100 is a lens-replaceable digital camera.

Optical system 110 includes iris 111, focusing lens 113, lens information retainer 114, iris drive 120, and focusing motor 140. Iris 111 regulates an amount of light on an optical axis shown with broken lines in optical system 110, and is driven by iris driver 120 based on a control signal supplied from controller 180 during AE (Auto Exposure). Iris 111 does not always need the regulating function, but it can be a fixed iris.

Focusing lens 113 moves along the optical axis of optical system 110, thereby adjusting a focus of the object image, and is controlled by focusing motor 140. Lens information retainer 114 retains lens parameter information proper to optical system 110. The lens parameter information includes an F-value, lens driving speed, and so on. The lens parameter information is transmitted to controller 180 by BL (Body-Lens) communication.

Focusing motor 140 drives and controls focusing lens 113, and it can be formed of a pulse motor, DC motor, linear motor, or servo motor. Focusing motor 140 can drive focusing lens 113 via a mechanism such as cum mechanism or a ball screw.

CMOS image sensor 150 shoots an image formed by optical system 110, and produces an image signal. It carries out an action such as exposure, transmission, and operating an electronic shutter. CMOS image sensor 150 corresponds to an imaging element. CMOS image sensor 150 can be replaced with a CCD (Charge Coupled Device) image sensor.

Video processing section 160 provides the image signal produced by CMOS image sensor 150 with various processes, and produces image data (hereinafter referred to as a live-view image) to be displayed on LCD monitor 230. Video processing section 160 also produces recording image data to be stored in memory card 200. Video processing section 160 provides the image signal with video processing such as gamma correct white-balance correction, or scar correction. On top of that, though it will be detailed later, video processing section 160 carries out a change in a depth of field. Video processing section 160 corresponds to an image processing section.

Video processing section 160 can be formed of a DSP (Digital Signal Processor) or a microprocessor. A resolution of the live-view image can be set equal to a resolution of LCD monitor 230, or to a resolution of recording image data formed by compressing the image signals in a compression format in accordance with JPEG (Joint Photographic Experts Group) standard.

Memory 170 functions as a work memory for video processing section 160 and controller 180, and it stores temporarily the image signal processed by video processing section 160 or image data prior to undergoing video processing section 160 and supplied from CMOS image sensor 150.

Memory 170 temporarily stores a shooting condition, used in the shooting, of optical system 110 and that of CMOS image sensor 150. The shooting conditions include image angle information, ISO (International Organization for Standardization) sensitivity, shutter speed, EV (Exposure Value), F value (iris value), distance between lenses, shooting time, and positional information of focusing lens 113 in optical system 110.

On top of that, memory 170 stores a blur signal (hereinafter referred to as a basic blur signal) which is usable commonly to multiple optical systems 110 by associating it with an index (blur signal index) in the case of using replaceable optical system 110. Each basic blur signal corresponds to a blurred shape. Multiple blur signals are available and they are integrated into a basic blur set.

Memory 170 stores the lens parameter information, obtained by controller 180, of optical system 110. Memory 170 is formed of, for instance, a DRAM (Dynamic Random Access Memory) or a ferroelectric memory.

Controller 180 controls imaging apparatus 100 overall, and is formed of a semiconductor element. Controller 180 can be formed of only hardware, or formed by combining hardware and software. Controller 180 can be formed of a microprocessor.

Controller 180 performs control such that distance information about the object, of which image has been formed by optical system 110, can be calculated. To be more specific, controller 180 obtains the lens parameter information of optical system 110 and, controls the DFD processing done by video processing section 160 for calculating information about a distance based on the following three items: (1) multiple blur signals stored in memory 170, (2) the lens parameter information of optical system 110, and (3) multiple image signals captured by CMOS image sensor 150 and having different in-focus positions from each other. The multiple image signals having different in-focus positions from each other can be obtained by driving the focusing lens 113 to different positions. The information about a distance refers to, for instance, a distance from imaging apparatus 100 to the object in other words, the information about distance refers to a depth viewed from imaging apparatus 100 to the object to be captured by CMOS image sensor 150. A reference point of the distance can be set optionally, for instance, it can be set at a position of a given lens of the lenses included in optical system 110. In the description below, the information about the distance is referred to as DFD distance information or distance information of an object.

Controller 180 can obtain the lens parameter information from optical system 110 and store it in memory 170 before it controls the DFD processing, or it can read the lens parameter information from optical system 110 in controlling the DFD processing. Controller 180 can also perform control such that all the lens parameter information of optical system 110 is stored in memory 170. In this case, parts of the lens parameter information to be stored in memory 170 can be deleted by a user through operating member 210 (operating section). Controller 180 can perform control such that the lens parameter info nation is read from memory card 200 and is stored in memory 170. The lens parameter information can include lens parameter information of optical system 110 having been mounted in the past to imaging apparatus 100, or can include lens parameter information of a lens not yet mounted.

Controller 180 obtains the lens parameter information proper to optical system 110, which is used for guiding the light from the object to CMOS image sensor 150, and this lens parameter information includes the information for specifying a part of the multiple basic blur signals. Based on the blur signals specified, of the multiple basic blur signals stored in memory 170, by the lens parameter information obtained by controller 180, controller 180 performs control such that the information about the distance to the object captured by CMOS image sensor 150 can be calculated. The specified blur signals are to be used for measuring the distance.

Card slot 190 is electrically or mechanically connectable to memory card 200, and writes or reads information into or from memory card 200, which is detachable from card slot 190.

Memory card 200 is a memory medium includes a flash memory or a ferroelectric memory therein. Memory card 200 is detachable from card slot 190.

Operating member 210 includes a release button (release operating section), which receives a press action of a user. When the user presses the release button halfway, AF (auto focus) control and AE (automatic exposure) control are started through controller 180. When the user fully presses the release button, the object is captured.

LCD monitor 230 is a display device for displaying the image signal produced by CMS image sensor 150 or the image signal read from memory card 200. It can display various setting information of imaging apparatus 100, for instance, shooting conditions when the object is captured, such as an EV value, F value, shutter speed, or ISO sensitivity. LCD monitor 230 corresponds to a display section. LCD monitor 230 includes a function of touch panel, so that the user can operate imaging apparatus 100 through the various setting information displayed on LCD monitor 230. In this case, monitor 230 is included in operating member 210.

1-2. Actions when a Live-View is Displayed

Figure 2:
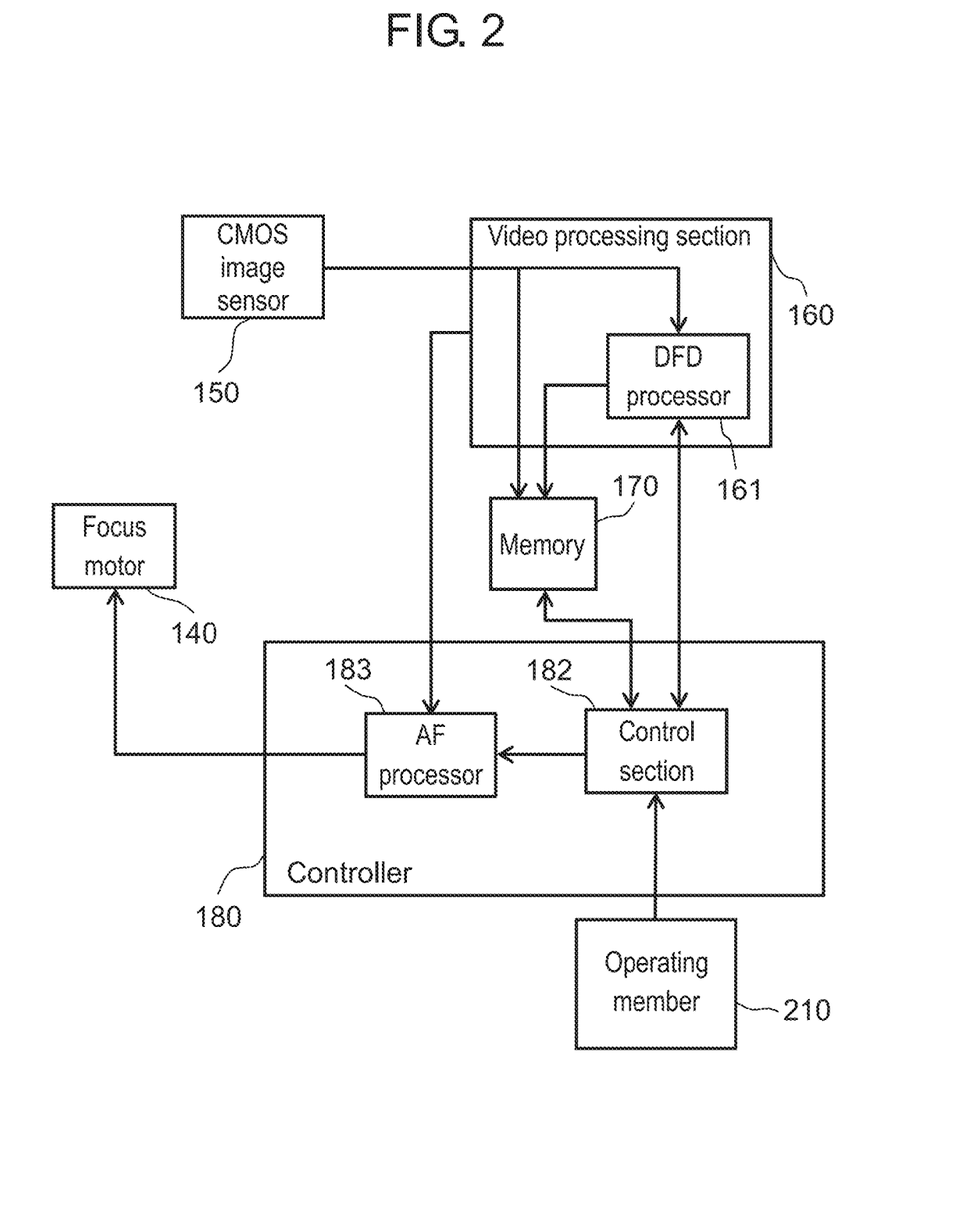
FIG. 2 shows an essential part of the imaging apparatus in accordance with the first embodiment.

A shooting action of imaging apparatus 100 in accordance with the first embodiment is demonstrated hereinafter. FIG. 2 focuses on a structure related to shooting actions of imaging apparatus 100 shown in FIG. 1, and details the structures of video processing section 160 and controller 180.

In FIG. 2, video processing section 160 includes DFD processor 161, and controller 180 includes control section 182A and AF processor 183.

A turn-on of imaging apparatus 100 by a user prompts imaging apparatus 100 to display an object image, which is formed on CMOS image sensor 150 by optical system 110, on LCD monitor 230 through video processing section 160 and controller 180. At this time, a live-view image that is the image of the object and displayed in real-time on LCD monitor 230 is a dynamic image displayed by sequentially displaying the image data obtained by CMOS image sensor 150. Imaging apparatus 100 updates the image data obtained by CMOS image sensor 150 at given time intervals (i.e. at every frame rate), and then displays the resultant image data on LCD monitor 230 as a live-view image. In the description below, a sheet of the dynamic images that are displayed as live-view images is referred to as one frame. Imaging apparatus 100 in accordance with this embodiment displays 60 frames of image for one second during the live-view display. In other words, imaging apparatus 100 in accordance with this embodiment displays a live-view image at a frame rate of 1/60 second.

Figure 3A:
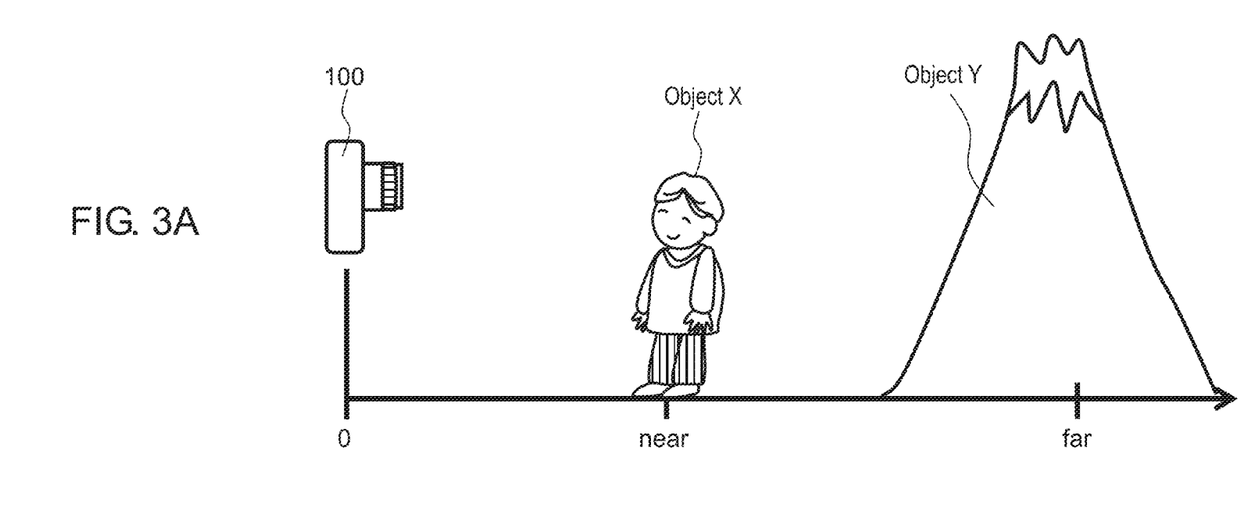
FIG. 3A shows a positional relation between an object and the in aging apparatus an accordance with the first embodiment.

FIG. 3A shows a positional relation between imaging apparatus 100 and an object to be captured by imaging apparatus 100. Imaging apparatus 100 is positioned at point 0, a person (object X) is located near to imaging apparatus 100, and a mountain (object Y) is located far from imaging apparatus 100.

Figure 3B:
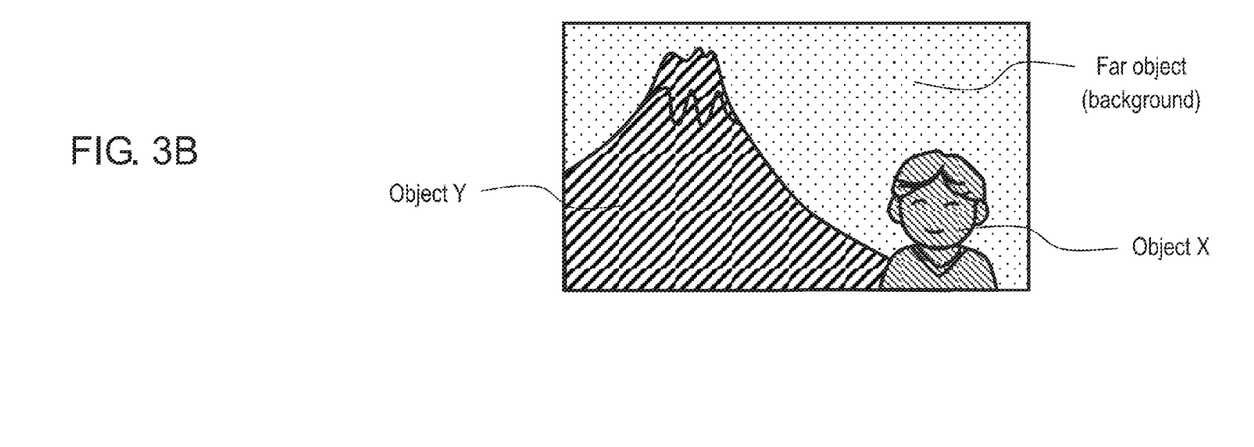
FIG. 3B shows distance information about an object to be captured by the imaging apparatus in accordance with the first embodiment.

FIG. 3B shows object-distance information produced by DFD processor 161 for the objects shown in FIG. 3A and to be captured by imaging apparatus 100. DFD processor 161 calculates the distances to the objects to be captured by imaging apparatus 100, and produces the object-distance information as a depth map. In FIG. 3B, object X located near to imaging apparatus 100 is covered with lines sloping down from right to left, object Y located far from imaging apparatus 100 is covered with lines sloping down from left to right, and an object (background) farther far is dotted. The expression of the distance information is not limited to these expressions, but it can be expressed with colors, numerals, or patterns.

As discussed above, imaging apparatus 100 is capable of obtaining object-distance information for each object, and is capable of displaying the obtained distance information on LCD monitor 230 during a live-view display.

Figure 4:
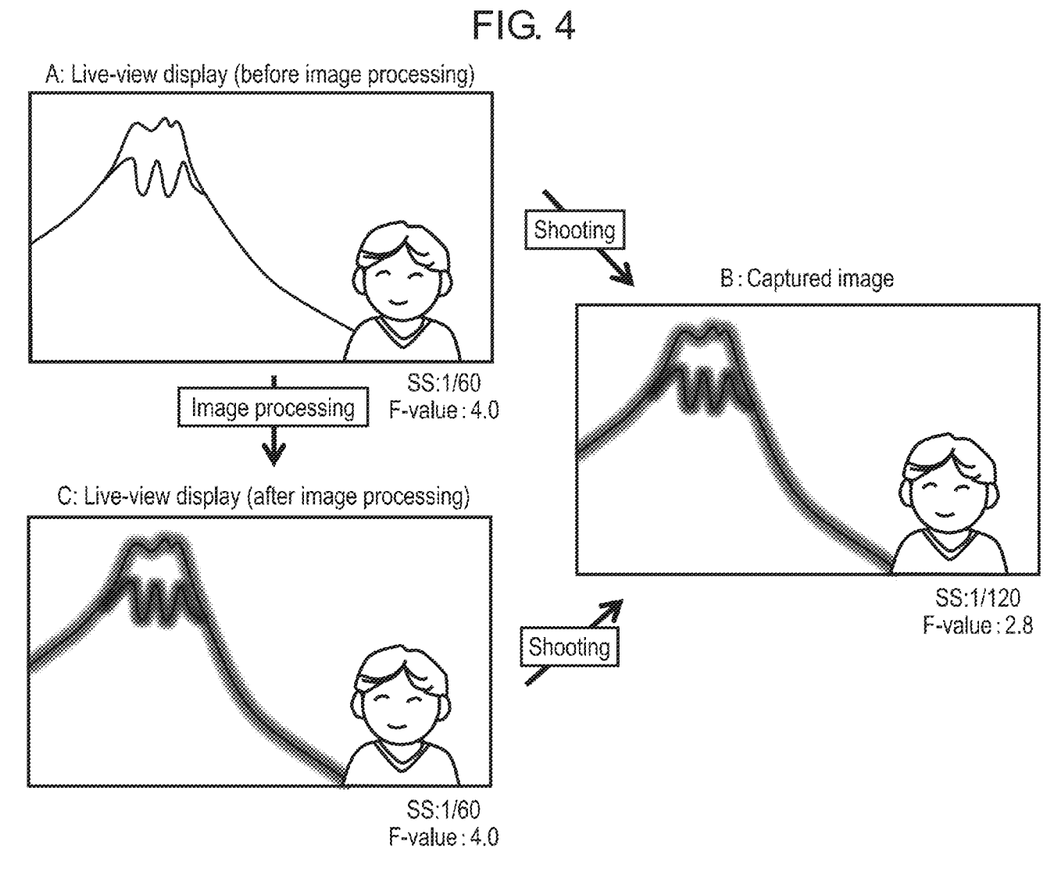
FIG. 4 shows an example of a live view displayed on the imaging apparatus in accordance with the first embodiment as well as an example of an image captured with the imaging apparatus in accordance with the first embodiment.

FIG. 4 shows examples of a live-view display and an image captured with imaging apparatus 100. The live-view display shown in FIG. 4A is displayed on LCD monitor 230 by a conventional method of imaging apparatus 100 shown in FIG. 3A. The shooting condition of this live-view is this: shutter speed (SS)=1/60 sec, and F value=4.0. Since the live-view display is a dynamic image, the shutter speed is set at a rather slow speed in order to obtain a natural dynamic image. If the shutter speed is set higher, a time for gathering images per frame becomes shorter; however, a frame rate during a playback of the dynamic image is kept unchanged although the shutter speed is changed, whereby some motions of the object are missed between frames.

The captured image shown in FIG. 4B is a still image captured with imaging apparatus 100 shown in FIG. 3A. To obtain a proper exposure for still images, the shooting condition is set as this: shutter speed=1/120 sec, and F value=2.8. The shooting condition thus differs from that (SS=1/60 sec, F-value=4.0) for the live-view display shown in FIG. 4A. As a result, the user cannot monitor the captured image (the image to be recorded) as a live-view image during a display of the same image.

If the shooting condition for shooting the still image is used for a live-view display with a shutter speed set at 1/120 sec, since the frame rate is set at 1/60, images for one frame are to be shot within a half time of the frame rate. As a result, dynamic images in a live-view display miss some motions of the object between each frame, so that the display is obliged to show unnatural dynamic images.

To overcome this problem, imaging apparatus 100 of the present disclosure uses a shutter speed that allows displaying a natural dynamic image in the live-view display, and at the same time, displays a live-view image having the same depth of field as it is used in shooting (recording) a still image.

FIG. 4C shows a live-view image displayed on LCD monitor 230 during a live-view display of imaging apparatus 100 in accordance with this embodiment. In the live-view display shown in FIG. 4C, the shooting condition is set equal to that of FIG. 4A (i.e. SS=1/60 sec and F-value=4.0). The live-view image displayed on LCD monitor 230 show in FIG. 4C uses the same depth of field (corresponding to F-value=2.8) as it is used in shooting the still image. This depth of field is achieved by image processing. In other words, imaging apparatus 100 in accordance with this embodiment maintains the shutter speed that allows exhibiting a natural dynamic image in a live-view display while achieving a depth of field, similar to that obtained when a still image is captured, through image processing. This structure allows imaging apparatus 100 to display a live-view image with a depth of field that is obtained when a still image is captured.

Figure 5:
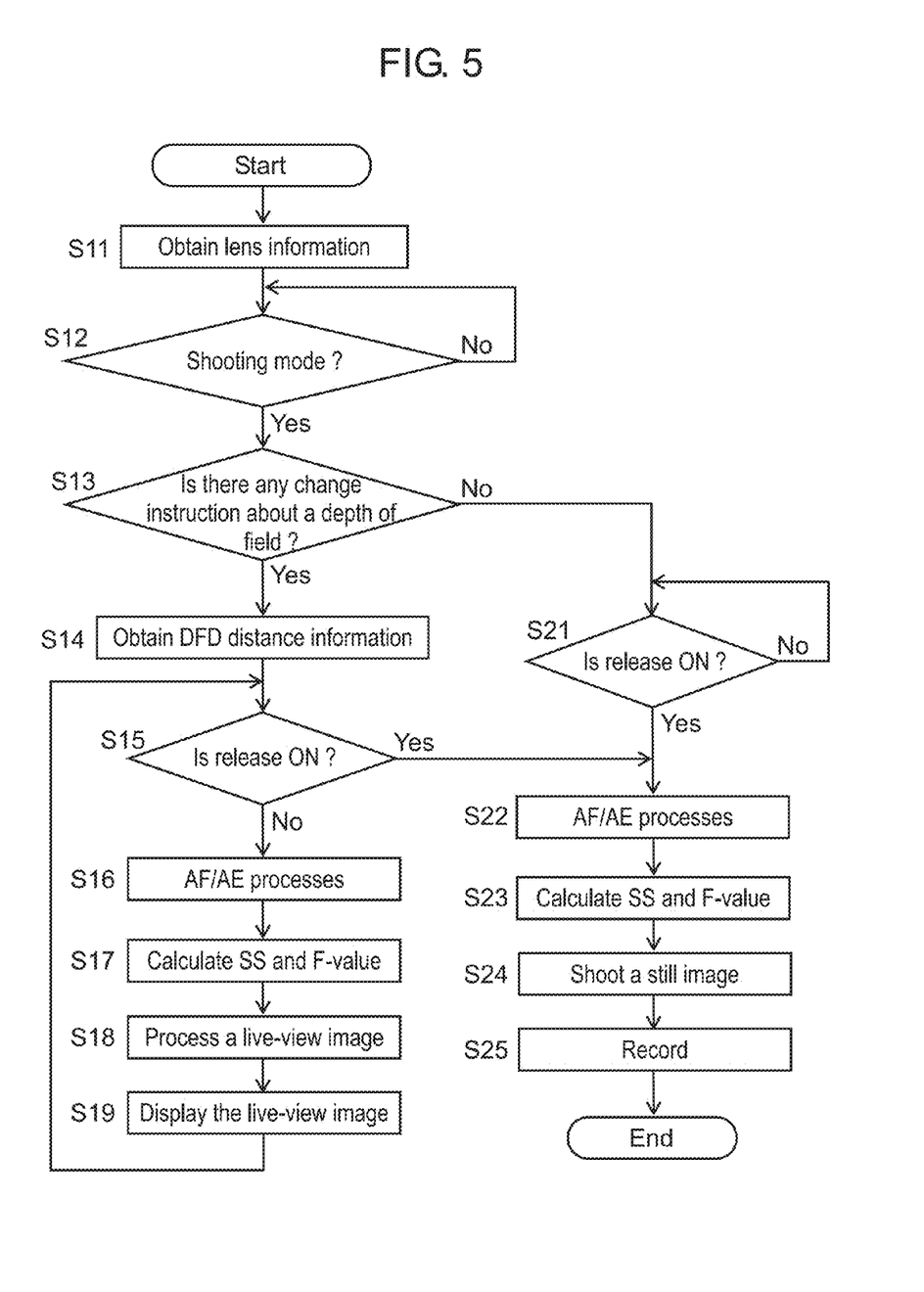
FIG. 5 is a flowchart of shooting a still image with the imaging apparatus in accordance with the first embodiment.

FIG. 5 is a flowchart of shooting a still image with imaging apparatus 100. A turn-on of imaging apparatus 100 by a user prompts imaging apparatus 100 to obtain lens information from an interchangeable lens that includes optical system 110 (step S11). After obtaining the lens information imaging apparatus 100 checks whether or not a shooting mode is ready (step S12).

When the shooting mode is ready, imaging apparatus 100 checks whether or not the user gives an instruction of changing a depth of field (step S13). When no instruction of the change is given (branch No of step S13), imaging apparatus 100 monitors whether or not the user carries out a release operation in step S21.

When the user gives the instruction of changing the depth of field (branch Yes of step S13), imaging apparatus 100 obtains DFD distance information by using DFD processor 161 (step S14). In other words, imaging apparatus 100 obtains object-distance information of the object to be captured. After obtaining the DFD distance information, imaging apparatus 100 monitors whether or not the user carries out the release operation (step S15).

Until the user carries out the release operation (branch No of step S15), imaging apparatus 100 carries out the processes shown in step S16-S19 in order to display a live-view (LV) image on LCD monitor 230. In step S16, imaging apparatus 100 carries out AF/AE processes for each frame of the live-view image.

Based on the object-distance information and the result of AF/AE processes, imaging apparatus 100 calculates a shutter speed and F-value to be used for shooting (recording) the still image (Step S17). In response to the F-value calculated and the object-distance information, imaging apparatus 100 processes the live-view image (step S18), and displays the resultant image on LCD monitor 230 (step S19). To be more specific, imaging apparatus 100 creates a depth map shown in FIG. 3B by using the object-distance information obtained by DFD processor 161 in step S14, and then, calculates the depth of field by using the F-value calculated. Imaging apparatus 100 provides an object not available in the range of the calculated depth of field with a blur process (image processing), thereby achieving the depth of field (a depth of field when an image is recorded) obtained when the still image is captured.

When the user carries out the release operation (branch Yes of step S15, branch Yes of step S21), imaging apparatus 100 starts shooting a still image. In step S22, imaging apparatus 100 provides the object image with AF/AE processes.

Depending on the result of AF/AE processes, imaging apparatus 100 calculates a shutter speed and an F-value suitable for shooting the still image (step S23). Based on the calculated shutter speed and the F-value, imaging apparatus 100 controls iris 111, CMOS image sensor 150, and the shutter (not shown), and then shoots the still image (step S24). Imaging apparatus 100 then stores the captured still image in a storage medium such as memory card 200 (step S25).

In the shooting actions discussed above, the F-value applied to the live-view display is preferably set greater than the F-value applied to the still image shooting in step S22. In other words, the depth of field applied to the live-view display is set deeper than the depth of field applied, to the still image shooting. Because imaging apparatus 100, in fact, can provide an image with a blur process; however, it is difficult for imaging apparatus 100 to make clear of a blurred image.

When providing a live-view image with a blur process, imaging apparatus 100 can employ a specific LIT (low pass filter, a filter cutting off high frequencies) for carrying out the blur process imaging apparatus 100 can change a cut-off frequency of the LPF in accordance with the obtained distance information for carrying out the blur process, thereby changing a blurred situation depending on the obtained distance information. Imaging apparatus 100 also can carry out the blur process by Fourier transformation following the obtained lens information.

1-3. Advantages

As discussed above, imaging apparatus 100 in accordance with this embodiment calculates a depth of field and an object-distance information in a live-view display, and achieves a depth of field similar to that in shooting a still image by an image processing. This mechanism allows a user to check an image obtained by shooting the still image while the live-view is displayed, so that usability of imaging apparatus 100 is improved.

In this embodiment, the foregoing mechanism is described as actions in shooting a still image; however, the present disclosure is not limited to this mechanism. For instance, in shooting a dynamic image, a depth of field similar to that of a live-view image can be obtained by a user's operation. The present disclosure is applicable also to this case.

Second Exemplary Embodiment

The second embodiment explains a blur process provided to a still image captured with imaging apparatus 100, which has the same structure as imaging apparatus 100 shown in FIGS. 1 and 2, so that detailed descriptions are omitted here. Actions of shooting a still image is demonstrated hereinafter with reference to FIGS. 6A, 6B, and 7.

2-1. Actions in Recording Still Images

Imaging apparatus 100 in accordance with the second embodiment is capable of applying any depth of field to still images to be captured.

Figure 6A:
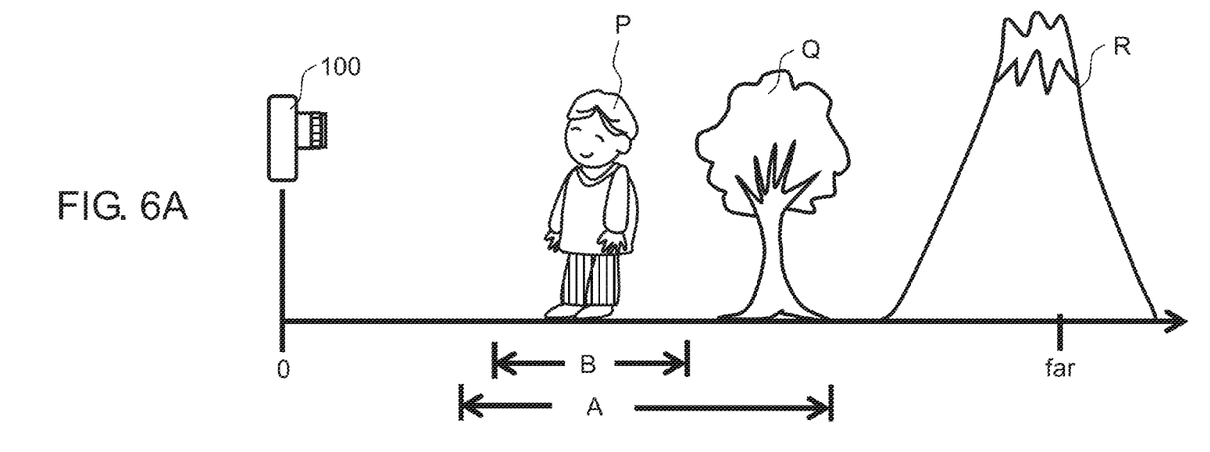
FIG. 6A shows a positional relation between an object and an imaging apparatus in accordance with a second embodiment.

FIG. 6A shows a positional relation between imaging apparatus 100 and objects to be captured by imaging apparatus 100, imaging apparatus 100 is positioned at point 0. Closer to imaging apparatus 100, objects are positioned in the order of objects P, Q, and R. The depth of field A indicates a depth of field determined by optical system 110 and the depth of field B indicates a depth of field specified by a user.

Figure 6B:
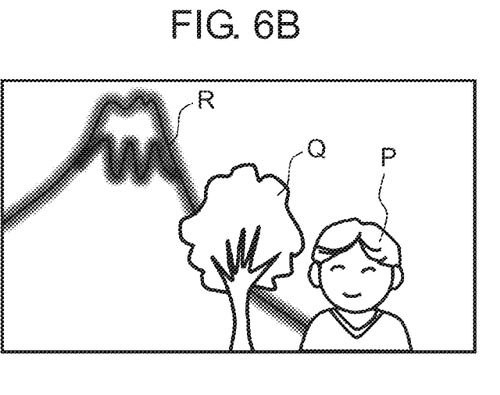
FIG. 6B shows an example of a first display of the imaging apparatus in accordance with the second embodiment.

FIG. 6B shows an example of the still image captured by imaging apparatus 100 shown in FIG. 6A. The depth of field A is applied to this still image, so that objects P and Q are in-focus, but object R is out of focus and blurredly displayed.

Figure 6C:
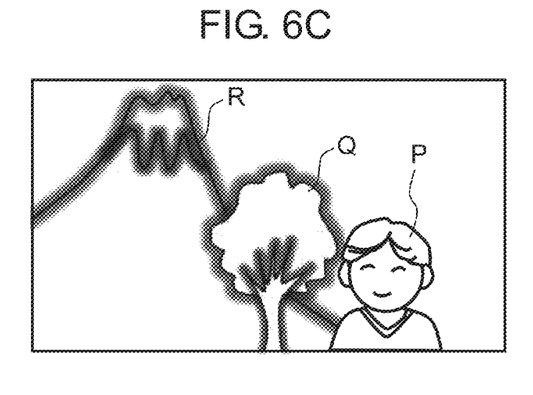
FIG. 6C shows an example of a second display of the imaging apparatus in accordance with the second embodiment.

FIG. 6C shows an example of a still image captured by imaging apparatus 100 show in FIG. 6A. Depth of field B is applied to the still image shown in FIG. 6C, so that object P is in-focus, and objects Q and R are out of focus and blurredly displayed.

As shown in FIG. 6A-FIG. 6C, imaging apparatus 100 in accordance with the second embodiment is capable of applying any depth of field to the still images to be captured. Imaging apparatus 100 calculates the depth of field A based on shooting conditions, while a user specifies depth of field B optionally to an object image. Imaging apparatus 100 is capable of achieving the still image, to which the depth of field B optionally specified by the user is applied, through image processing, without using the calculated depth of field A.

Figure 7:
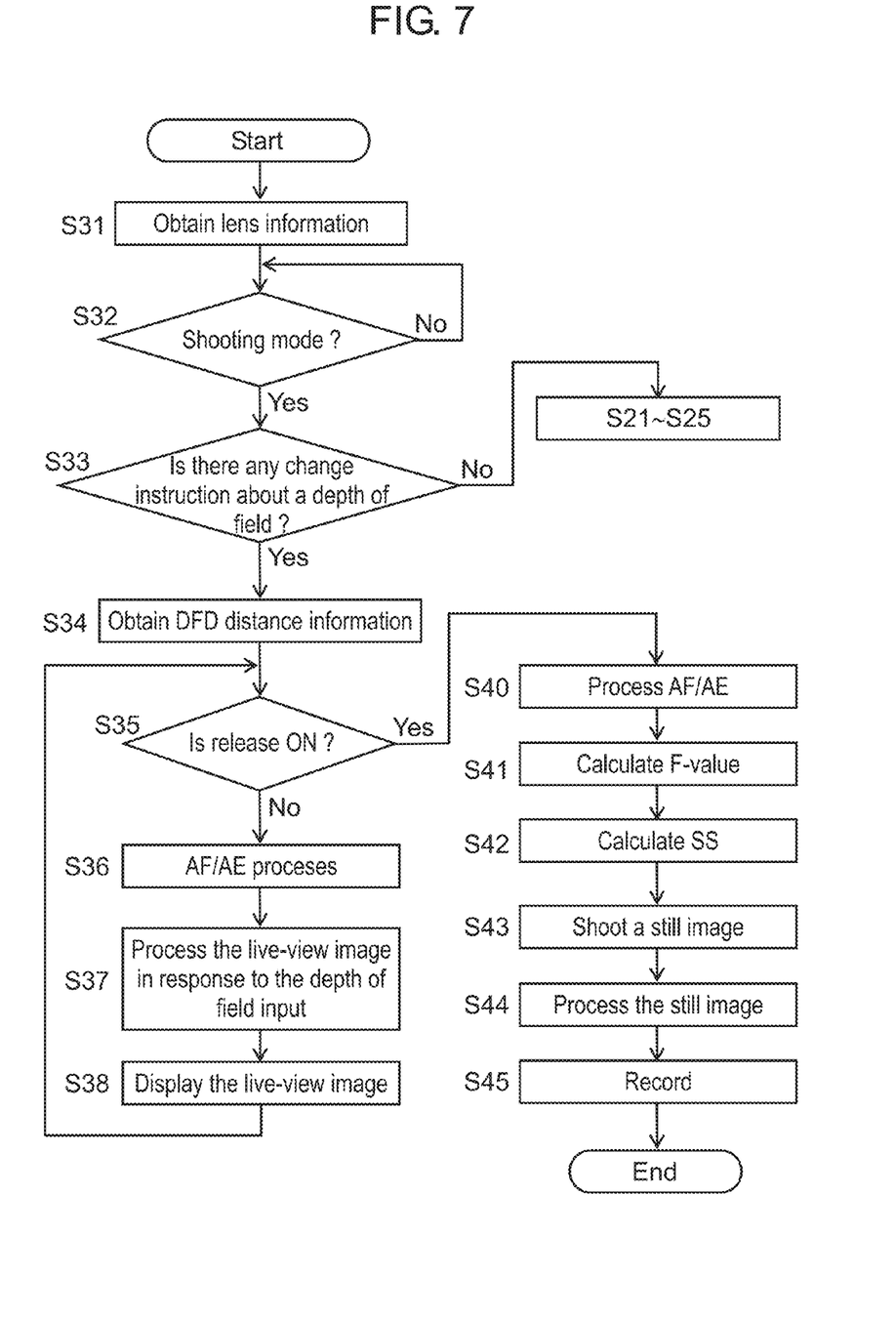
FIG. 7 is a flowchart of shooting a still image with the imaging apparatus in accordance with the second embodiment.

FIG. 7 is a flowchart of shooting still images with imaging apparatus 100 in accordance with the second embodiment. A turn-on of imaging apparatus 100 prompts it to obtain lens information from an interchangeable lens including optical system 110 (step S31), then apparatus 100 checks whether or not the shooting mode is ready (step S32).

When the shooting mode is ready (branch Yes of step S32), imaging apparatus 100 checks whether or not the user gives an instruction of changing a depth of field (step S33). In step S33, the user can input a desirable depth of field as a change instruction via operating member 210. When no instruction of changing the depth of field is given (branch No of step S33), imaging apparatus 100 carries out the processes shown in step S21-step S25.

When the user gives the instruction of changing the depth of field (branch Yes of step S33), imaging apparatus 100 obtains DFD distance information by using DFD processor 161 (step S34). In other words, imaging apparatus 100 obtains object-distance information of the object to be captured. After obtaining the DFD distance information, imaging apparatus 100 monitors whether or not the user carries out the release operation (step S35).

Until the user carries out the release operation (branch No of step S35), imaging apparatus 100 carries out the processes shown in steps S36-S38 in order to display a live-view image on LCD monitor 230. In step S36, imaging apparatus 100 carries out AF/AE processes for each frame of the live-view image.

Based on the object-distance information and a result of the AF/AE processes, imaging apparatus 100 processes the live-view image in response to the depth of field B input by the user (step S37), and then displays the resultant image (step S38). To be more specific, based on the object-distance information and a depth map obtained by DFD processor 161, imaging apparatus 100 calculates an object to be fit in the depth of field B input by the user, while imaging apparatus 100 provides other objects that are out of range of the depth of field B with a blurring process, and the resultant blurred images are reflected on the live-view image. For instance, as FIGS. 6A-6C show, in the case where the depth of field B is input by the user, objects Q and R are provided with the blurring process.

When the user carries out a release operation (branch Yes of step S35), imaging apparatus 100 starts shooting a still image. In step S40, imaging apparatus 100 provides the object image with AF/AE processes.

In response to the result of the AF/AE processes, in aging apparatus 100 calculates an F-value (step S41). At this time, since the change instruction of the depth of field has been given and the desirable depth of field has been input in step S33, imaging apparatus 100 sets the F-value which makes the depth of field A deeper than the depth of field B. Because imaging apparatus 100 can provide an image with a blurring process, but it is difficult for imaging apparatus 100 to make clear of a blurred image.

Imaging apparatus 100 calculates a shutter speed based on the F-value obtained in step S41 so as to get proper exposure (step S42). Through the processes in step S40-step S42, the shooting conditions are determined, then imaging apparatus 100 carries out the shooting of the still image (step S43).

After the shooting of the still image, imaging apparatus 100 provides the still image captured with a blurring process so as to achieve the depth of field B input by the user (step S44), and then stores the captured still image in memory card 200 (step S45).

Figure 8A:
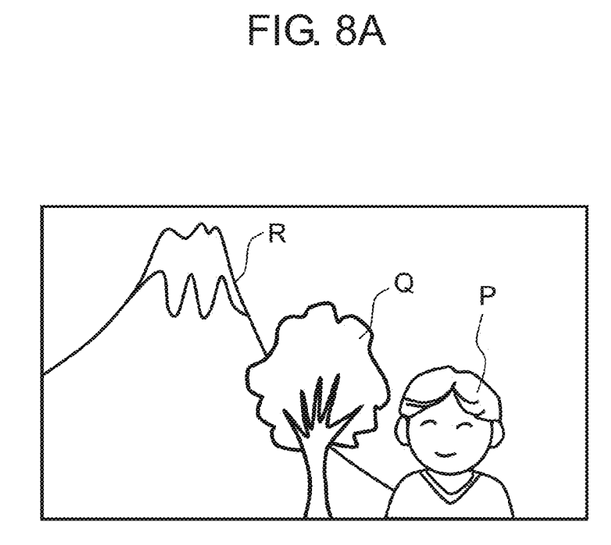
FIGS. 8A and 8B show a display example when a depth of field is changed in the imaging apparatus in accordance with the second embodiment.
Figure 8B:
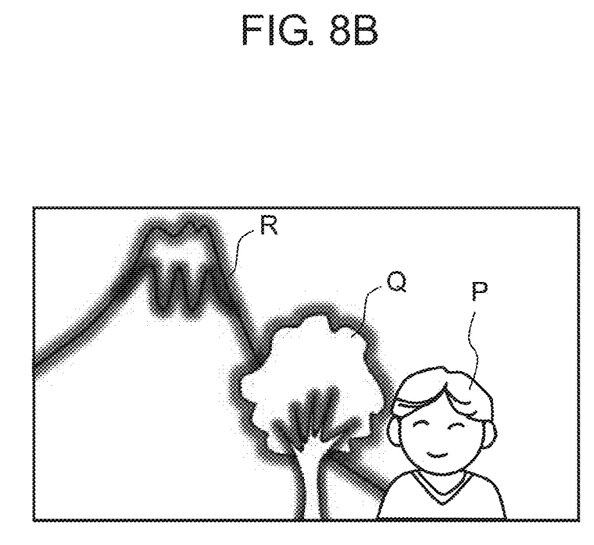

Next, the input of the depth of field B by the user in step S33 is detailed hereinafter. FIGS. 8A and 8B show examples of displays to which the user input the depth of field B. When the user gives a change instruction of the depth of field to imaging apparatus 100, apparatus 100 displays the live-view image in order to accept the change instruction. The user then selects a target object (e.g. object P) from the live-view image shown in FIG. 8A. The selection of object P prompts imaging apparatus 100 to calculate the depth of field B covering object P based on the object-distance information obtained by the DFD process. Then as discussed previously imaging apparatus 100 processes the live-view image in response to the depth of field B (step S37 shown in FIG. 7). Then the release operation carried out by the user prompts imaging apparatus 100 to start shooting the still image at the F-value that achieves the depth of field A deeper than the depth of field B (step S43 in FIG. 7). Imaging apparatus 100 then provides the objects (e.g. objects Q, R) not available in the region of the depth of field B with a blurring process, as shown in FIG. 8B, for achieving the depth of field B.

2-2. Advantages

As discussed above, when the user shoots still images with imaging apparatus 100, the user specifies the depth of field B optionally for designating an in-focus region and a blurred region, thereby shooting an image at any depth of field. In this second embodiment, the description refers to actions when a still image is captured; however, the present disclosure is not limited to this description. For instance, during a shoot of a dynamic image, the same depth of the field is used for both a live-view image and a dynamic image by a user's operation, the present disclosure is applicable to this case.

In this second embodiment, the user designates a specific object, and imaging apparatus 100 provides objects not designated by the user with a blurring process; however, the present disclosure is not limited to this description. For instance, the user can directly input the depth of field B, or the user designates at least two points on the display of the live-view image, so that imaging apparatus 100 finds a position of an object at a shortest distance and a position of an object at a longest distance based on the object-distance information, and transforms these positions into the information of the depth of field.

Imaging apparatus 100 can calculates the depth of field based on specific lens information input by a user. This structure allows aging apparatus 100 to achieve an image by image processing, although this image has been captured with an interchangeable lens having different optical performance from an interchangeable lens now mounted to imaging apparatus 100.

In this second embodiment, the user selects a desirable object from the objects on the live-view image, and imaging apparatus 100 sets the depth of field so as to focus on this selected object. However, the present disclosure is not limited to this structure. For instance, imaging apparatus 100 recognizes whether or not objects, which have been registered in advance by a user, are available on a live-view image with an object recognition section, and in the case of the objects are included on the live-view image, imaging apparatus 100 can set the depth of field so that the object enters inside an in-focus range. The registration of the objects can be done by conventional techniques such as an object recognition, face recognition, or personal recognition.

3. Other Embodiments

The first and second embodiments have been demonstrated as examples of the techniques disclosed herein; however, the present disclosure is not limited to these embodiments, and applicable to embodiments in which changes, replacements, additions, or omissions are done. The structural elements shown in the first and second embodiments can be combined to create another embodiment. Other embodiments are thus demonstrated hereinafter.

A digital camera including an interchangeable lens with an optical system being detachable is used as the imaging apparatus in the first and second embodiments; however, the present disclosure is not limited to this structure. For instance, an optical system can be integrated into an imaging apparatus. An optical system, a CMOS image sensor, and video processing section can be integrated into one unit, and this unit is replaceable.

The DFD method is used for calculating the object-distance information in the first and second embodiments; however, the present disclosure is not limited to this description. For instance, an active method can be used, where an object is irradiated with a laser beam, and the object-distance is calculated based on a time until a reflection wave returns or an angle of the reflection wave. A passive method also can be used, where the object-distance information can be calculated with an image sensor of image-surface phase difference, or a phase-difference sensor.

A detachable memory card is used in the first and second embodiments; however, the present disclosure is not limited to this structure. The memory card can be not always detachable.

On top of that, a digital camera is used as the imaging apparatus; however, the present disclosure is not limited to this structure. The present disclosure is applicable to electron telescopes, electron microscopes which require actions of measuring distances and focusing.

INDUSTRIAL APPLICABILITY

The present disclosure is applicable to imaging apparatus of digital cameras and portable phones, electron telescopes, and electron microscopes.

What is claimed is:

1. An imaging apparatus comprising:
   a release operating section configured to receive a recording instruction from a user;
   an optical system including at least one lens;
   an imaging element configured to form an object image with light collected by the optical system, and produce first image data; and
   an image processing section configured, prior to receiving the recording instruction from the user, to calculate a distance to an object for the object image, and produce second image data by providing the first image data with image processing,
   wherein the image processing section calculates, based on the calculated distance to the object, a depth of field in recording which would be applied as the depth of field once the release operating section receives the recording instruction given by the user, and carries out the image processing by applying the calculated depth of field in recording a live view image.

2. The imaging apparatus according to claim 1 further comprising:
   a display section capable of displaying a live-view image that shows an object image in real time,
   wherein the display section displays, as the live-view image, the second image data to which the depth of field in recording is applied.

3. The imaging apparatus according to claim 1, wherein the optical system includes a focusing lens, and
   the image processing section calculates a distance to an object by using an amount of blur of a plurality of image data having different in-focus states obtained by driving the focusing lens.

4. The imaging apparatus according to claim 1 further comprising a recording section that records an image captured, wherein the second image data is recorded in the recording section.

5. The imaging apparatus according to claim 1 further comprising an operating section for receiving an operation by a user, wherein the depth of field is set based on information input through the operating section.

6. The imaging apparatus according to claim 5, wherein the image processing section calculates distances to at least two points of an object specified by the user through the operating section, and sets the depth of field so as to cover a shortest distance position and a longest distance position among the distances to the at least two points of the object.

7. The imaging apparatus according to claim 5, wherein the image processing section sets the depth of field based on specific lens information input by the user through the operating section.

8. The imaging apparatus according to claim 5, wherein the image processing section further includes an object recognition section that determines whether or not an object specified by the user through the operating section is captured in the first image data, and then sets the depth of field so that the recognized object enters inside an in-focus range.

* * * * *